United States Patent
Yang et al.

(10) Patent No.: US 11,843,467 B2
(45) Date of Patent: Dec. 12, 2023

(54) DYNAMIC SLOT AGGREGATION CONFIGURATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/357,310

(22) Filed: Jun. 24, 2021

(65) Prior Publication Data

US 2021/0409169 A1    Dec. 30, 2021

Related U.S. Application Data

(60) Provisional application No. 63/044,769, filed on Jun. 26, 2020.

(51) Int. Cl.
*H04L 1/1867* (2023.01)
*H04L 5/00* (2006.01)
(Continued)

(52) U.S. Cl.
CPC .......... *H04L 1/1896* (2013.01); *H04L 5/0012* (2013.01); *H04W 72/0446* (2013.01); *H04W 72/23* (2023.01)

(58) Field of Classification Search
CPC ... H04L 1/1896; H04L 5/0012; H04L 1/0017; H04L 1/0022; H04L 1/0026;
(Continued)

(56) References Cited

U.S. PATENT DOCUMENTS

2015/0296512 A1\* 10/2015 Bergström ............ H04L 5/0098
370/329
2015/0358193 A1\* 12/2015 Lorca Hernando ........................
H04L 27/26526
370/329
(Continued)

OTHER PUBLICATIONS

Ericsson: "Discussion on the Remaining Issues on DL Quality Report for eMTC", 3GPP TSG-RAN WG4 Meeting #94-e-Bis, 3GPP Draft, R4-2004014, 3rd Generation Partnership Project (3GPP), Mobile Competence Centre, 650, Route Des Lucioles, F-06921 Sophia-Antipolis Cedex, France, vol. RAN WG4, No. Online Meeting, Apr. 20, 2020-Apr. 30, 2020, Apr. 10, 2020 (Apr. 10, 2020), pp. 1-4, XP051872541, Retrieved from the Internet: URL: https://ftp.3gpp.org/tsg_ran/WG4_Radio/TSGR4_94_eBis/Docs/R4-2004014.zip, R4-2004014 eMTC QR Remaining Issues.docx [retrieved on Apr. 10, 2020], The whole document.
(Continued)

*Primary Examiner* — Rownak Islam
(74) *Attorney, Agent, or Firm* — Patterson & Sheridan LLP

(57) ABSTRACT

Certain aspects of the present disclosure provide techniques for slot aggregation configuration with user equipment (UE) assistance information. A method that may be performed by a UE may include transmitting, to a base station (BS), assistance information indicating a preferred repetition factor. The method generally includes receiving an indication from the BS of a repetition factor. The BS can determine the repetition factor for the UE based, at least in part, on the assistance information and indicate the determined repetition factor to the UE.

30 Claims, 11 Drawing Sheets

(51) Int. Cl.
*H04W 72/0446* (2023.01)
*H04W 72/23* (2023.01)

(58) Field of Classification Search
CPC ... H04L 1/1825; H04L 1/1864; H04L 5/0055;
H04W 72/0446; H04W 72/23
USPC .................................................. 370/329, 392
See application file for complete search history.

(56) References Cited

U.S. PATENT DOCUMENTS

| | | | | |
|---|---|---|---|---|
| 2020/0120662 | A1* | 4/2020 | Gao | H04W 76/11 |
| 2020/0383095 | A1* | 12/2020 | Moon | H04L 5/0094 |
| 2021/0337467 | A1* | 10/2021 | Li | H04W 72/04 |
| 2022/0014314 | A1* | 1/2022 | Wang | H04L 1/08 |
| 2022/0103294 | A1* | 3/2022 | Ying | H04W 72/23 |
| 2022/0346118 | A1* | 10/2022 | Wu | H04L 1/1854 |

OTHER PUBLICATIONS

International Search Report and Written Opinion—PCT/US2021/039113—ISA/EPO—dated Oct. 18, 2021.

Qualcomm Inc: "UE Assistance Information for Power Saving", 3GPP Draft, 3GPP TSG-RAN WG2 Meeting #105bis, R2-1903053, UE Assistance Information for Power Saving, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700410, 3 pages, Retrieved from the Internet: URL: http://www.3gpp.org/ftp/Meetings%5F3GPP%5FSYNC/RAN2/Docs/R2%2D1903053%2Ezip [retrieved on Apr. 6, 2019] paragraph [0002].

Xiaomi Communications: "Discussion on the Remaining Issues of Transmission in Preconfigured UL Resources", 3GPP TSG RAN WG1 Meeting #99, 3GPP Draft, R1-1912364, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 8, 2019 (Nov. 8, 2019), 3 Pages, XP051820005, Retrieved from the Internet: URL: https://www.3gpp.org/ftp/tsg_ran/WG1_RL1/TSGR1_99/Docs/R1-1912364.zip, R1-1912364.doc [retrieved on Nov. 8, 2019] paragraph [02.2].

* cited by examiner

DYNAMIC SLOT AGGREGATION CONFIGURATION

CROSS-REFERENCE TO RELATED APPLICATION(S)

This application claims benefit of and priority to U.S. Provisional Application No. 63/044,769, filed Jun. 26, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamic slot aggregation configuration.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved slot aggregation configuration.

Certain aspects of the subject matter described in this disclosure can be implemented in a method for wireless communication by a user equipment (UE). The method generally includes transmitting, to a base station (BS), assistance information indicating a preferred repetition factor. The method generally includes receiving a dynamic indication from the BS of a repetition factor.

Certain aspects of the subject matter described in this disclosure can be implemented in a method for wireless communication by a BS. The method generally includes receiving assistance information, from a UE, indicating a preferred repetition factor. The method generally includes determining a repetition factor for the UE. The method generally includes transmitting a dynamic indication of the determined repetition factor to the UE.

Certain aspects of the subject matter described in this disclosure can be implemented in a method for wireless communication by a UE. The method generally includes transmitting, to a BS, assistance information indicating a preferred slot aggregation configuration. The method generally includes receiving an indication from the BS of a slot aggregation configuration based, at least in part, on the preferred slot aggregation configuration.

Certain aspects of the subject matter described in this disclosure can be implemented in a method for wireless communication by a BS. The method generally includes receiving assistance information, from a UE, indicating a preferred slot aggregation configuration. The method generally includes determining a slot aggregation configuration for the UE based, at least in part, on the assistance information. The method generally includes indicating the determined slot aggregation configuration to the UE.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate certain aspects of this disclosure and are not to be considered limiting, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
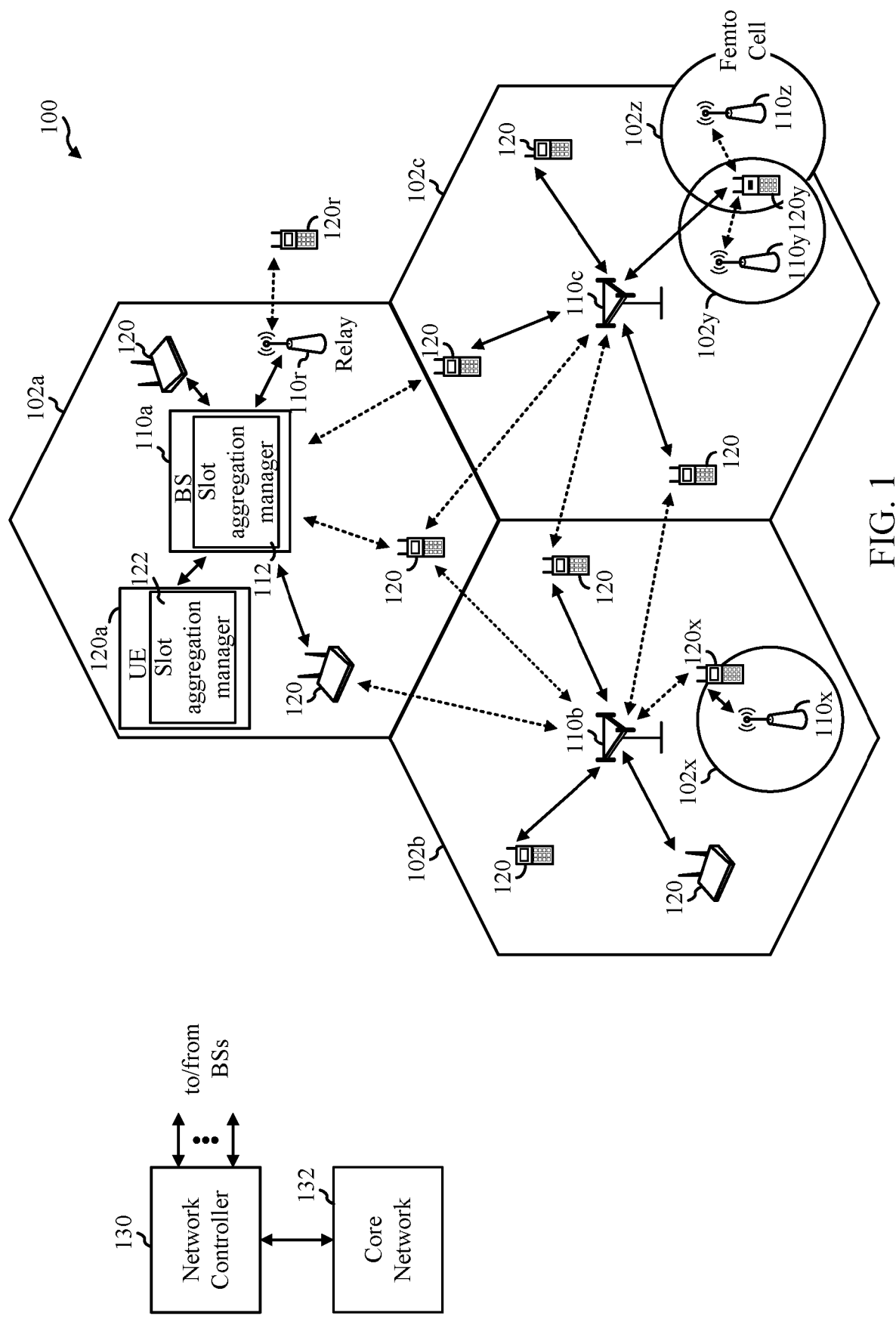
FIG. 1 is a block diagram conceptually illustrating an example wireless communication network, in accordance with certain aspects of the present disclosure.

Aspects of the present disclosure provide apparatus, methods, processing systems, and computer readable mediums for slot aggregation configuration with user equipment (UE) assistance information.

A network may configure repetition to increase reliability and reduce latency. For example, the network may be configured repetitions of transport block (TB). In some cases, the repetition may be referred to as slot aggregation, where the TB is repeated in a number of consecutive slots. The amount of repetition may be referred to as the repetition level or slot aggregation level.

Aspects of the disclosure provide for fast switching of the amount of repetition. Radio resource control (RRC) signaling to semi-statically configure the repetition may involve a longer latency and lower throughput. Aspects of the disclosure provide for dynamically signaling the amount of repetition. A user equipment (UE) can provide UE assistance information to a base station (BS). The UE assistance information may indicate a preferred repetition factor to the BS. The repetition factor corresponds to a number of repetitions. The BS can dynamically indicate a repetition to the UE based on the UE assistance information. For example, the BS may accept or reject the UE's preferred repetition factor and, therefore, the repetition factor that the BS dynamically signals to the UE may be the preferred repetition factor or may be a different repetition factor.

The following description provides examples of slot aggregation with UE assistance information in communication systems. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems, including later generation communication systems.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. Aggregation of multiple cells may be supported.

FIG. 1 illustrates an example wireless communication network 100 in which aspects of the present disclosure may be performed. For example, wireless communication network 100 may be an NR system (e.g., a 5G NR network). As shown in FIG. 1, wireless communication network 100 may be in communication with a core network 132. Core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS may support one or multiple cells.

BSs 110 communicate with UEs 120 in the wireless communication network 100. UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). Network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, BSs 110 and UEs 120 may be configured for slot aggregation. As shown in FIG. 1, BS 110a includes a slot aggregation manager 112. Slot aggregation manager 112 may be configured to receive assistance information from UE 120a. The assistance information may indicate a preferred slot aggregation configuration associated with time domain repetitions of one or more transmissions. Slot aggregation manager 112 may be configured to determine a slot aggregation configuration for the UE. Slot aggregation manager 112 may be configured to indicate the determined slot aggregation configuration to UE 120a. UE 120a includes a slot aggregation manager 122. Slot aggregation manager 122 may be configured to transmit, to the BS 110a, assistance information indicating a preferred slot aggregation configuration. Slot aggregation manager 122 may be configured to receive an indication from BS 110a of a slot aggregation configuration.

Figure 2:
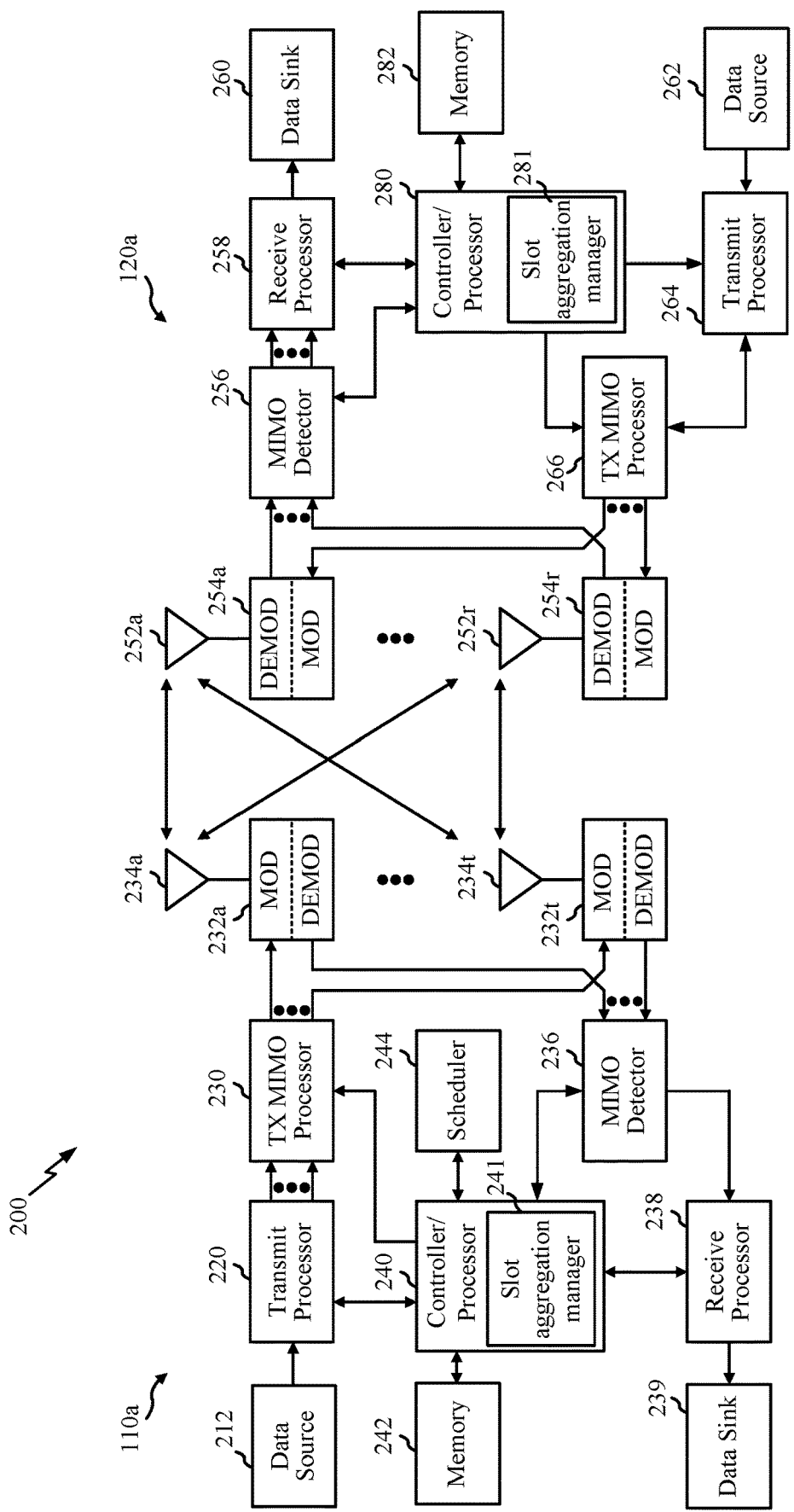
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via antennas 234a-234t, respectively.

At UE 120a, antennas 252a-252r may receive the downlink signals from BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110a. At BS 110a, the uplink signals from UE 120a may be received by antennas 234, processed by modulators 232, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110a and UE 120a, respectively. A scheduler 244 may schedule UEs for transmission on the downlink and/or uplink.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of the BS 110a has a slot aggregation manager 241 that may be representative of slot aggregation manager 112. Controller/processor 280 of UE 120a has a slot aggregation manager 281 that may be representative of slot aggregation manager 122. Although shown at the controller/processor, other components of UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
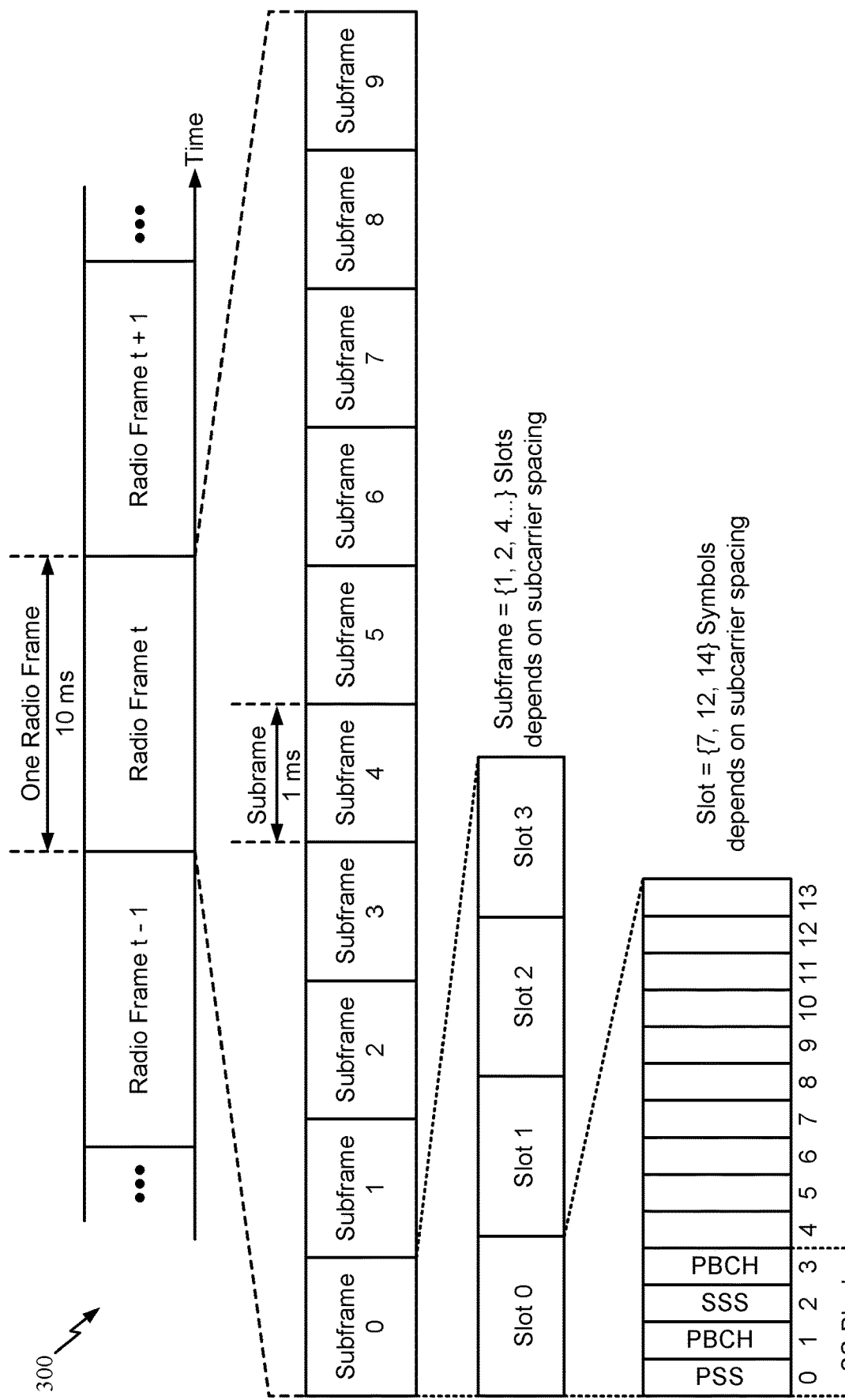
FIG. 3 is an example frame format for certain wireless communication systems, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure refers to a transmit time interval having a duration less than a slot (e.g., 2, 3, or 4 symbols). Each symbol in a slot may be configured for a particular link direction (e.g., DL, UL, or flexible) and the link directions may be dynamically switched. The link directions may be based on a slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As mentioned above, aspects of the disclosure related to slot aggregation configuration. A transmission may be repeated in the time domain. With slot aggregation, a transmission may span multiple consecutive slots, which may be referred to as aggregated slots. In some example, a transport block (TB) is repeated in each of the aggregated slots. The number of consecutive slots in which the TB is repeated may be referred to as the repetition level or aggregation level.

In certain systems (e.g., 3GPP Release-15 systems), multiple uplink/downlink (UL/DL) slot aggregation levels are defined (e.g., in the 3GPP wireless specifications). Slot aggregation may increase reliability and reduce latency and may have a low spectrum efficiency cost. Based on the slot aggregation level, the same TB may be repeatedly transmitted. For example, for slot aggregation levels 1, 2, 4, 8, the TB may be repeated in one slot, two consecutive slots, four consecutive slots, eight consecutive slots, respectively, and so.

In some cases, the slot aggregation configuration may be switched. The slot aggregation configuration may be switched via semi-static radio resource control (RRC) signaling, which may involve a high latency, in turn resulting in lower throughput. In such systems, the slot aggregation configuration switching may be done by the network without any input from the UE. This may further result in lower throughput and/or increased latency. For example, without UE input, the network may switch the slot aggregation level more often.

Accordingly, what is needed are techniques and apparatus for slot aggregation configuration.

Example Dynamic Slot Aggregation Configuration

Aspects of the present disclosure provide techniques and apparatus for dynamic slot aggregation configuration. In some examples, a base station (BS), such as BS 110*a* in wireless communication network 100) can dynamically indicate a repetition factor to a user equipment (UE), such as UE 120*a* in wireless communication network 100. The UE may provide assistance information to the network (e.g., to the BS). The UE assistance information may indicate a preferred repetition factor. The UE assistance information may indicate a preferred slot aggregation configuration. The preferred slot aggregation configuration may indicate various preferred slot aggregation related parameters including the preferred repetition factor. The network may take the UE's preferred slot aggregation configuration parameters into account when determining a slot aggregation configuration to configure/schedule at the UE or may reject the UE's preferred slot aggregation configuration.

Figure 4:
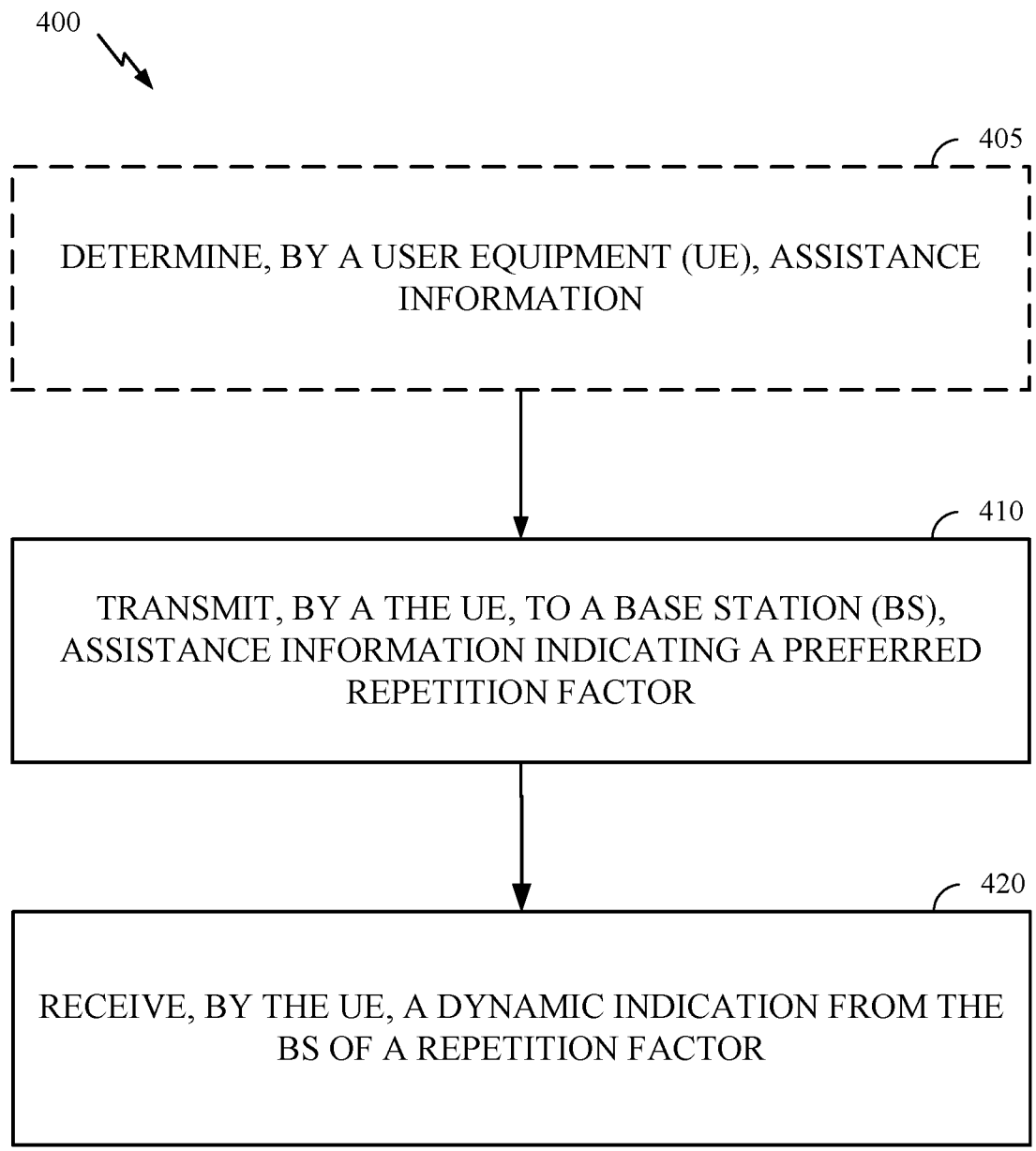
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. Operations 400 may be performed, for example, by a UE (e.g., UE 120*a* in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 400 may begin, at block 410, by transmitting, to a BS, assistance information indicating a preferred repetition factor. The repetition factor indicates a number of time domain repetitions. The repetition factor may indicate a number of consecutive slots for repetitions of a TB.

According to certain aspects, the assistance information transmitted at block 410 indicates a preferred uplink repetition factor and/or a preferred downlink repetition factor. The repetition factor may also be referred to as a slot aggregation level. The assistance information may include a preferred slot aggregation configuration. The preferred slot aggregation configuration may include the preferred repetition factor. The preferred slot aggregation configuration may include a preferred uplink slot aggregation level, a preferred downlink slot aggregation level, or both.

According to certain aspects, the assistance information transmitted at block 410 includes an indication of whether the UE prefers slot aggregation crossing slot boundary. The assistance information may include an indication of one or more preferred slot aggregation crossing downlink switch points and/or one or more preferred slot aggregation crossing uplink switch points. With slot aggregation crossing slot boundaries, a repetition using multiple symbols, may use one or more symbols in a slot and then one or more symbols in a next slot.

According to certain aspects, the assistance information transmitted at block 410 includes one or more preferred starting symbol positions indicating a starting symbol within a slot for transmission/reception of a repetition. The preferred starting symbol may be indicated per time domain repetition (e.g., per slot)

According to certain aspects, the assistance information transmitted at block 410 includes a preferred symbol length. The preferred symbol length may be indicated per time domain repetition (e.g., per slot)

According to certain aspects, the assistance information transmitted at block 410 includes a preferred invalid symbol pattern indicating invalid symbols for segmentation. The preferred invalid symbol pattern may be indicated per time domain repetition (e.g., per slot)

According to certain aspects, the assistance information transmitted at block 410 includes a number of symbols for each repetition of the TB.

According to certain aspects, the assistance information transmitted at block 410 includes a preferred redundancy version (RV) pattern associated with the time domain repetitions According to certain aspects, the assistance information transmitted at block 410 includes an indication of whether slot aggregation or sub-slot aggregation is preferred by the UE. For example, sub-slot aggregation may include repetitions within a slot, such as a first repetition (e.g., of a first TB) on the first two symbols of the slot and another repetition (e.g., of a different TB) on the second two symbols.

According to certain aspects, the assistance information transmitted at block 410 include an indication of whether frequency hopping is preferred by the UE for the time domain repetitions. With frequency hopping, each repetition may be transmitted on different frequencies, for example, according to a frequency hopping pattern. The assistance information may include a preferred frequency hopping pattern. The assistance information may include a preferred frequency offset for the frequency hops. The assistance information may include an indication of whether frequency hopping within a slot is preferred by the UE. The assistance information may include an indication of whether frequency hopping in crossing slots is preferred by the UE. In some examples, the UE may indicate frequency hopping for repetitions in sequential symbols, while repetitions in non-sequential symbols are transmitted on the same frequency.

According to certain aspects, the assistance information transmitted at block 410 includes an indication of a preference for the UE to send an early hybrid automatic repeat request (HARQ) acknowledgement. With early HARQ ACK, the UE can send an ACK for the once the UE successfully decodes a TB even before all repetitions of the TB have been sent. Thus, once the UE successfully decodes the TB, the network can halt sending the remainder of the repetitions of the TB.

Examples are described above of UE assistance information that can be transmitted by the UE to indicate a preferred slot aggregation configuration. A subset of or all of the examples of assistance information discussed above can be provided by the UE to the BS. The assistance information may be provided together or separately.

Operations 400 may include, at block 405, determining the assistance information. For example, before transmitting the assistance information to the BS at block 410, the UE can determine its preferred slot aggregation configuration at block 405. The UE may determine the assistance information, at block 405, based on a mobility of the UE (e.g., a mobility state). The UE may determine the assistance information, at block 405, based on radio frequency (RF) variation (e.g., based on channel measurements). The UE may determine the assistance information, at block 405, based on a UE configuration. The UE may determine the assistance information, at block 405, based on a target quality of service (QoS) for a service. The UE may determine the assistance information, at block 405, based on target QoS for a mix of services with different QoS. The UE may determine the assistance information, at block 405, based on service requirements. For example, NR supports various services such as ultra-reliable low-latency communications (URLLC) service, enhanced mobile broadband (eMBB) service, and others. Theses service may have different service requirements, such as different latency and reliability requirements. The UE may determine the assistance information, at block 405, based on a subset of, all of, or any of combination of the above parameters.

According to certain aspects, the UE can transmit the assistance information, at 410, via radio resource control (RRC) signaling, a medium-access control (MAC) control element (CE), a channel status information (CSI) report, or a combination thereof. The UE can transmit the assistance information during call setup, during call resume, during call handover, and/or during an on-going call. For example, the UE may transmit the assistance information in a RRC call setup request message during call setup or handover. The UE may transmit the assistance information in a RRC call resume message during call resume or handover. The UE may transmit the assistance information in a MAC-CE or CSI report during an on-going call.

At 420, operations 400 include receiving a dynamic indication from the BS of a repetition factor. The dynamic indication of the repetition factor may be received from the BS via RRC signaling, MAC-CE, downlink control information (DCI), or a combination thereof.

Figure 5:
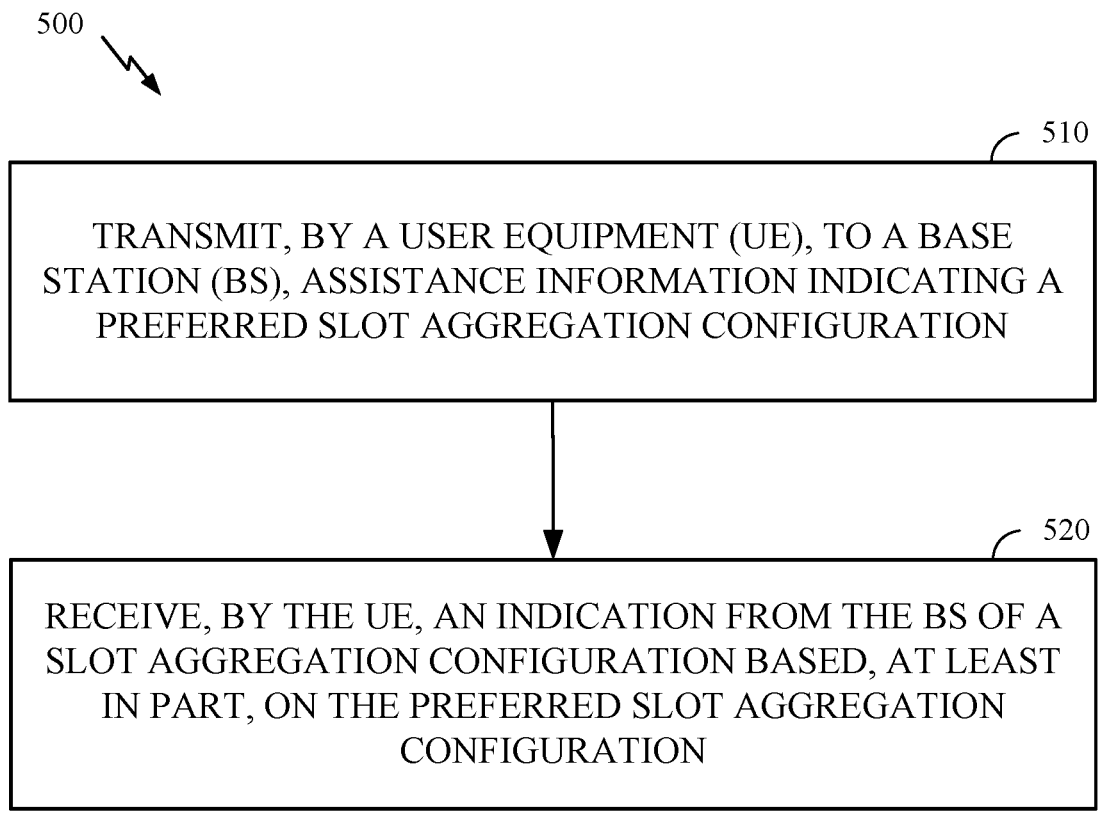
FIG. 5 is another flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. Operations 500 may be performed, for example, by UE (e.g., UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 may begin, at block 510, by transmitting, to a BS, assistance information indicating a preferred slot aggregation configuration. The slot aggregation may be associated with time domain repetitions of one or more transmissions.

At block 520, the UE receives an indication from the BS of a slot aggregation configuration based, at least in part, on the preferred slot aggregation configuration. For example, the BS may accept the UEs preferred slot aggregation configuration, and the slot aggregation configuration received from the BS matches the preferred slot aggregation configuration. In some examples, the BS rejects all or part of the UEs preferred slot aggregation configuration and the UE receives a different or partially different slot aggregation configuration from the BS.

Figure 6:
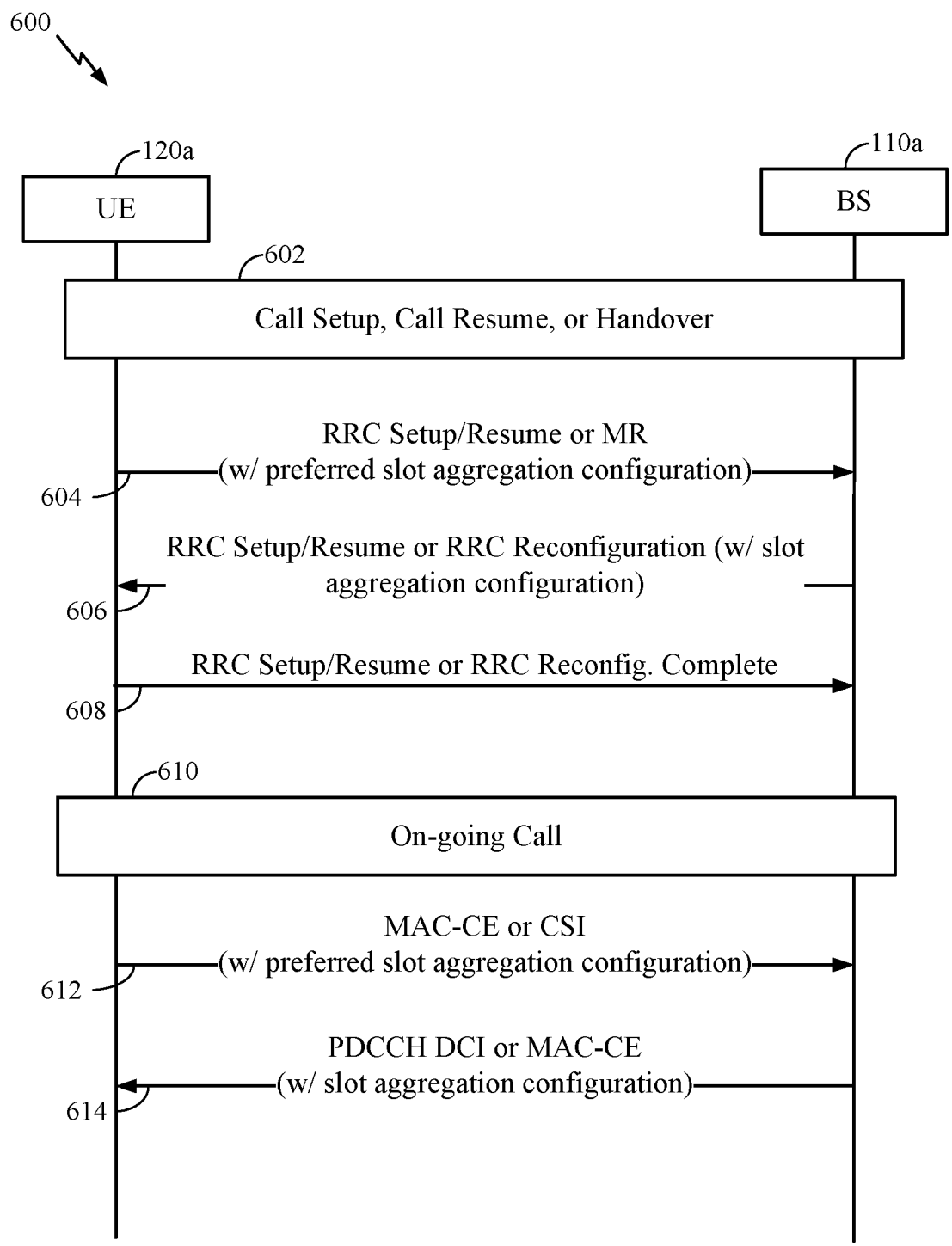
FIG. 6 is a call flow diagram illustrating example slot aggregation configuration, in accordance with certain aspects of the present disclosure.

FIG. 6 is a call flow diagram illustrating example signaling 600 for slot aggregation configuration, in accordance with certain aspects of the present disclosure. As shown in FIG. 6, the UE 120*a* and BS 110*a* may be engaged in a call set up procedure, a call resume procedure, or a handover procedure, at 602. UE 120*a* may send the BS 110*a* an RRC set up message (e.g., if during a call setup procedure), an RRC resume message (e.g., if during a call resume procedure), or a measurement report (e.g., if during a handover procedure) with assistance information indicating a preferred slot aggregation configuration, at 604. At 606, BS 110*a* may send UE 120*a* an RRC setup message, an RRC resume message, or an RRC reconfiguration message indication a slot aggregation configuration. BS 110*a* may determine the slot aggregation configuration taking into account the assistance information from UE 120*a*. At 608, UE 120*a* may respond to BS 110*a* with an RRC set up message, an RRC resume message, or an RRC reconfiguration complete message.

Additionally or alternatively, UE 120*a* may provide assistance information during an on-going call as shown in FIG. 6, at 610. For example, at 612, UE 120*a* may provide assistance information, indicating a preferred slot aggregation configuration, in a MAC-CE and/or with a CSI report. At 614, BS 110*a* may send DCI in a PDCCH, or a MAC-CE, indicating a slot aggregation configuration for UE 120*a*.

Figure 7:
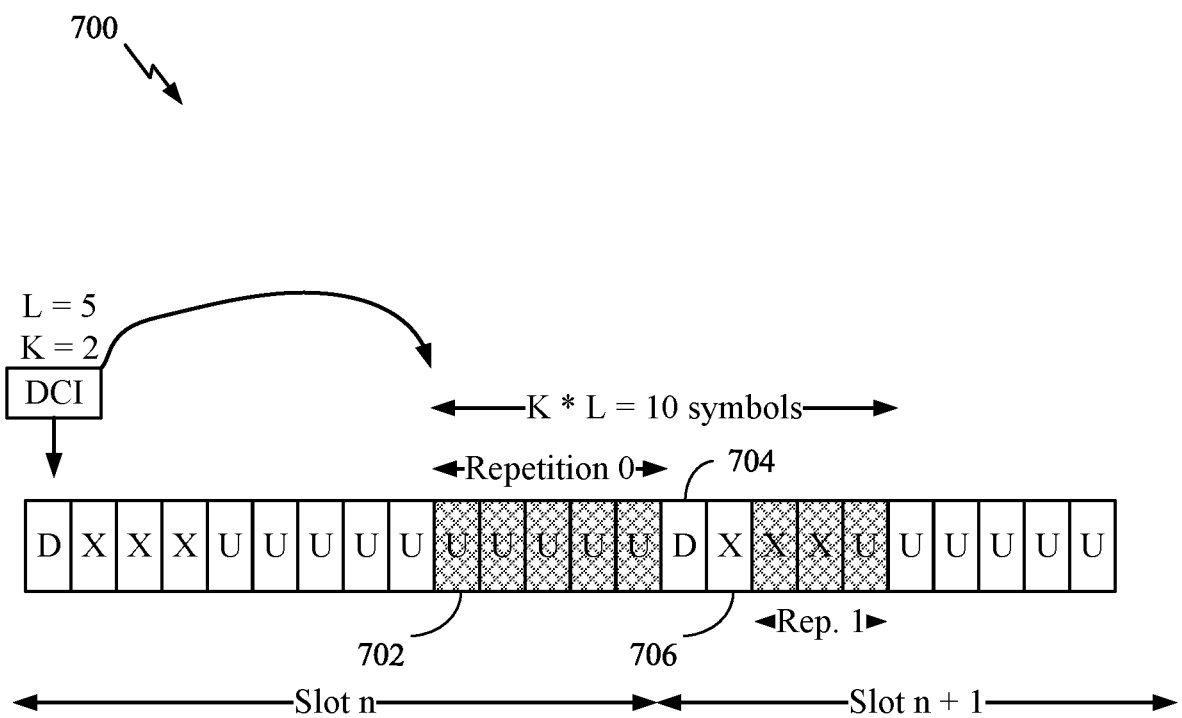
FIG. 7 is a block diagram illustrating example invalid symbol pattern, in accordance with certain aspects of the present disclosure.

As discussed above, the assistance information from the UE may indicate a preferred slot aggregation configuration including one or more parameters. For example, as mentioned above, the assistance information may indicate an invalid symbol pattern. FIG. 7 illustrates an example invalid symbol pattern 700. The invalid symbol pattern indicates symbols that are not usable for repetitions. As shown in FIG. 7, a slot (n and n+1) are configured with uplink symbols U, downlink symbols D, and flexible symbols X. L is the number of symbols of each repetition (e.g., if no segmentation). K is the number of repetitions. In some cases, the flexible symbols can be used for repetitions, while in some cases the flexible symbols may be invalid for repetitions. In the example shown in FIG. 7, L=5 and K=2, where L is the number of symbols that can be used for a repetition and K is the number of repetitions. Therefore, the absolute length is K×L=10 symbols. The repetitions may be scheduled by a DCI to start in symbol 702 in the slot n. In the example in FIG. 7, symbol 704 is a downlink symbol and symbol 706 is a flexible and is an invalid symbol according an invalid symbol pattern. S is the number of symbols used for all of the repetitions. In the example in FIG. 6, S=8 because the downlink symbol 704 and the invalid symbol 706 are not used for transmitting the repetitions.

Figure 8:
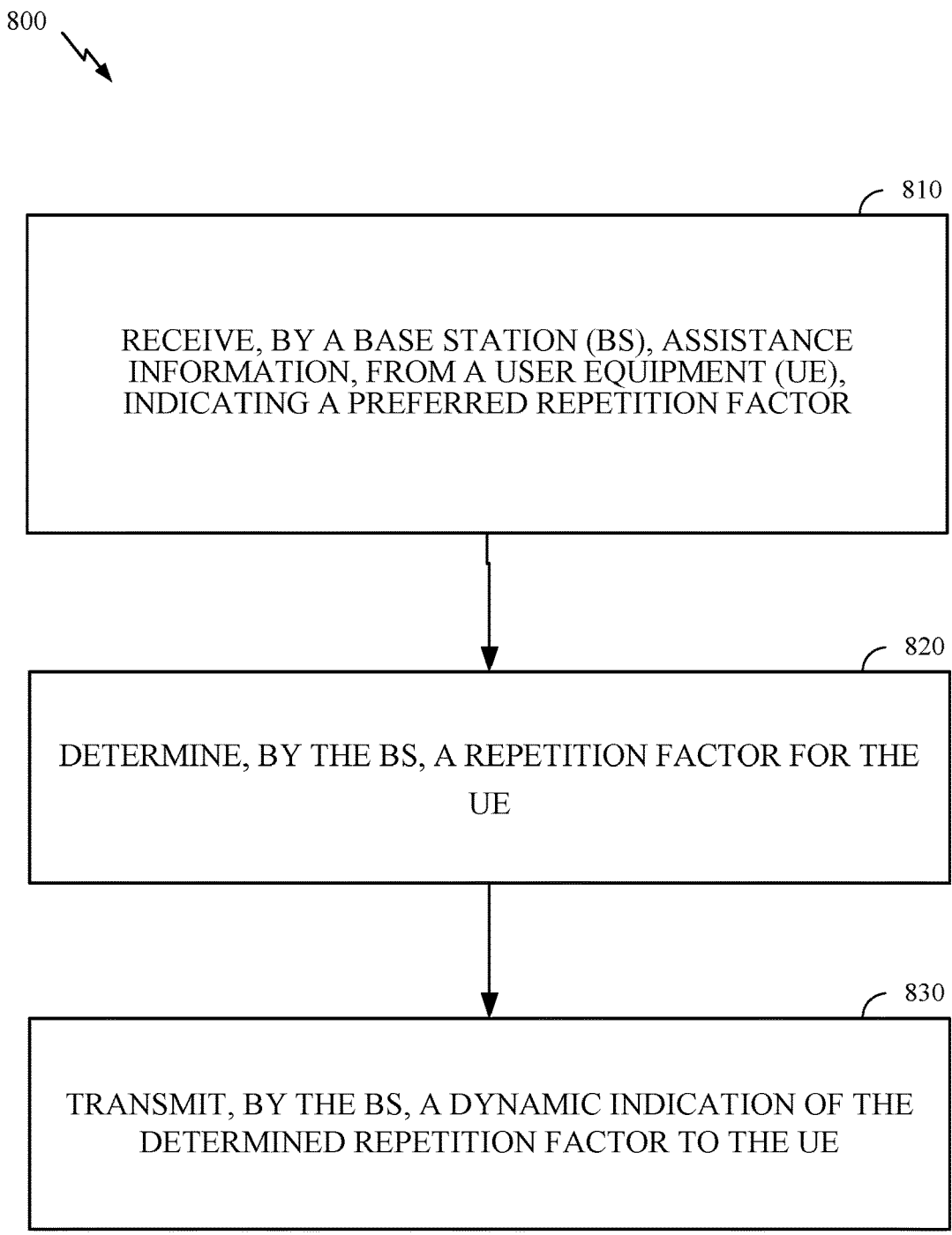
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. Operations 800 may be performed, for example, by a BS (e.g., the BS 110*a* in the wireless communication network 100). Operations 800 may be complimentary to operations 400 performed by the UE. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 800 may begin, at block 810, by receiving assistance information, from a UE, indicating a preferred repetition factor. The repetition factor may indicate a number of time domain repetitions, such as a number of consecutive slots for repetitions of a TB.

Operations 800 include, at block 820, determining a repetition factor for the UE. The BS may determine a slot aggregation configuration for the UE based, at least in part, on a preferred slot aggregation configuring from the UE in the assistance information. The BS may accept or reject the preferred repetition factor.

Operations 800 include, at block 830, transmitting a dynamic indication of the determined repetition factor to the UE.

Figure 9:
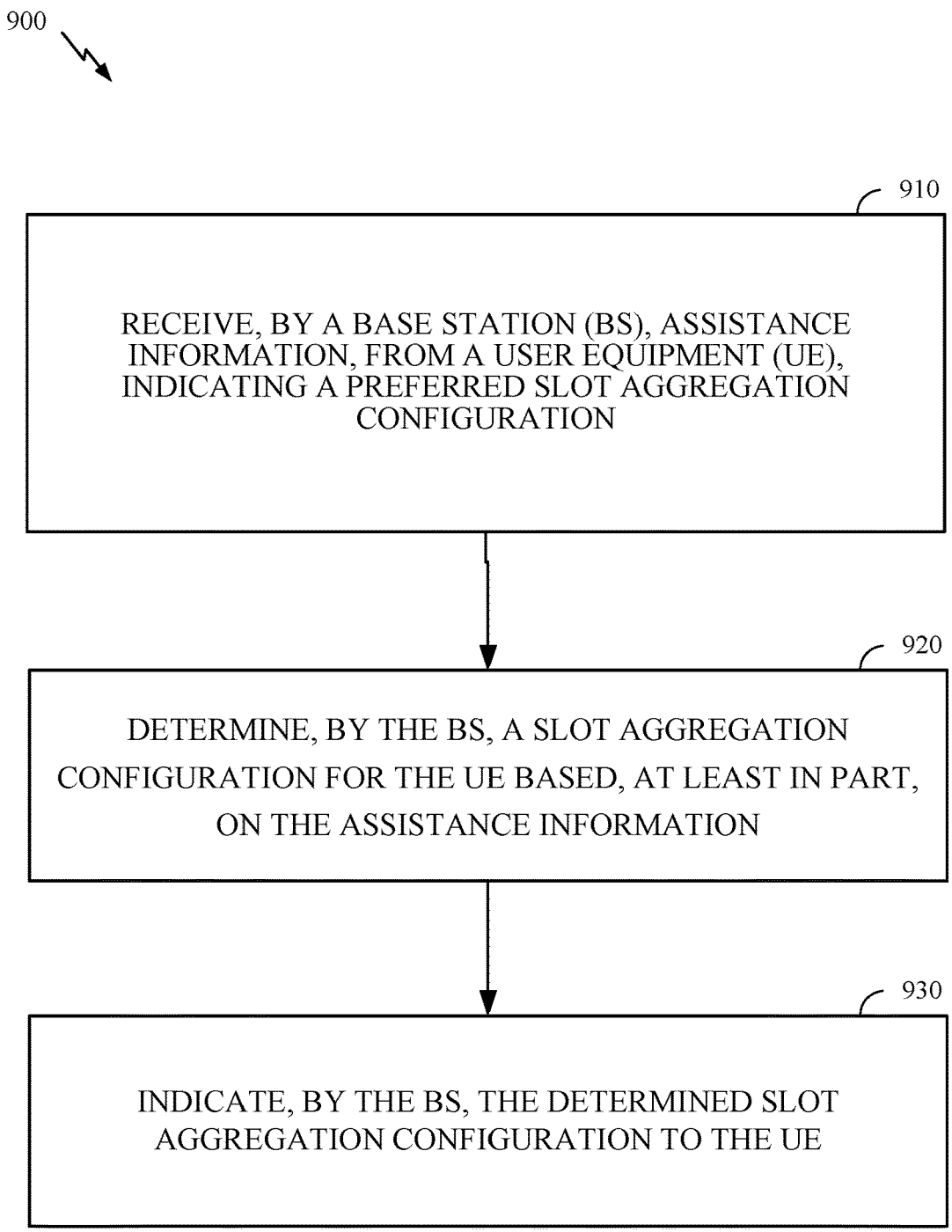
FIG. 9 is another flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. Operations 900 may be performed, for example, by a BS (e.g., the BS 110*a* in the wireless communication network 100). Operations 900 may be complimentary to operations 500 performed by the UE. Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 900 may begin, at block 910, by receiving assistance information, from a UE, indicating a preferred slot aggregation configuration. The slot aggregation may be associated with time domain repetitions of one or more transmissions.

Operations 900 include, at block 920, determining a slot aggregation configuration for the UE based, at least in part, on the assistance information.

Operations 900 include, at block 930, indicating the determined slot aggregation configuration to the UE.

According to certain aspects, the BS can select and/or switch the slot aggregation configuration based on the assistance information. For example, the BS may select and/or switch one or more of the parameters based on the preferred parameters indicated by the UE in the assistance information. The BS may select or switch the modulation coding scheme (MCS)/CSI table via MAC-CE, DCI, or RRC. The BS may select or switch the slot aggregation configuration and/or the MCS/CSI table based on measured uplink sounding reference signal (SRS), uplink demodulation reference signal (DMRS), HARQ retransmissions, HARQ round trip time, uplink block error rate (BLER), downlink BLER, and/or Doppler frequency. In some cases, the BS can select or switch without UE assistance information, based on the measurements.

Figure 10:
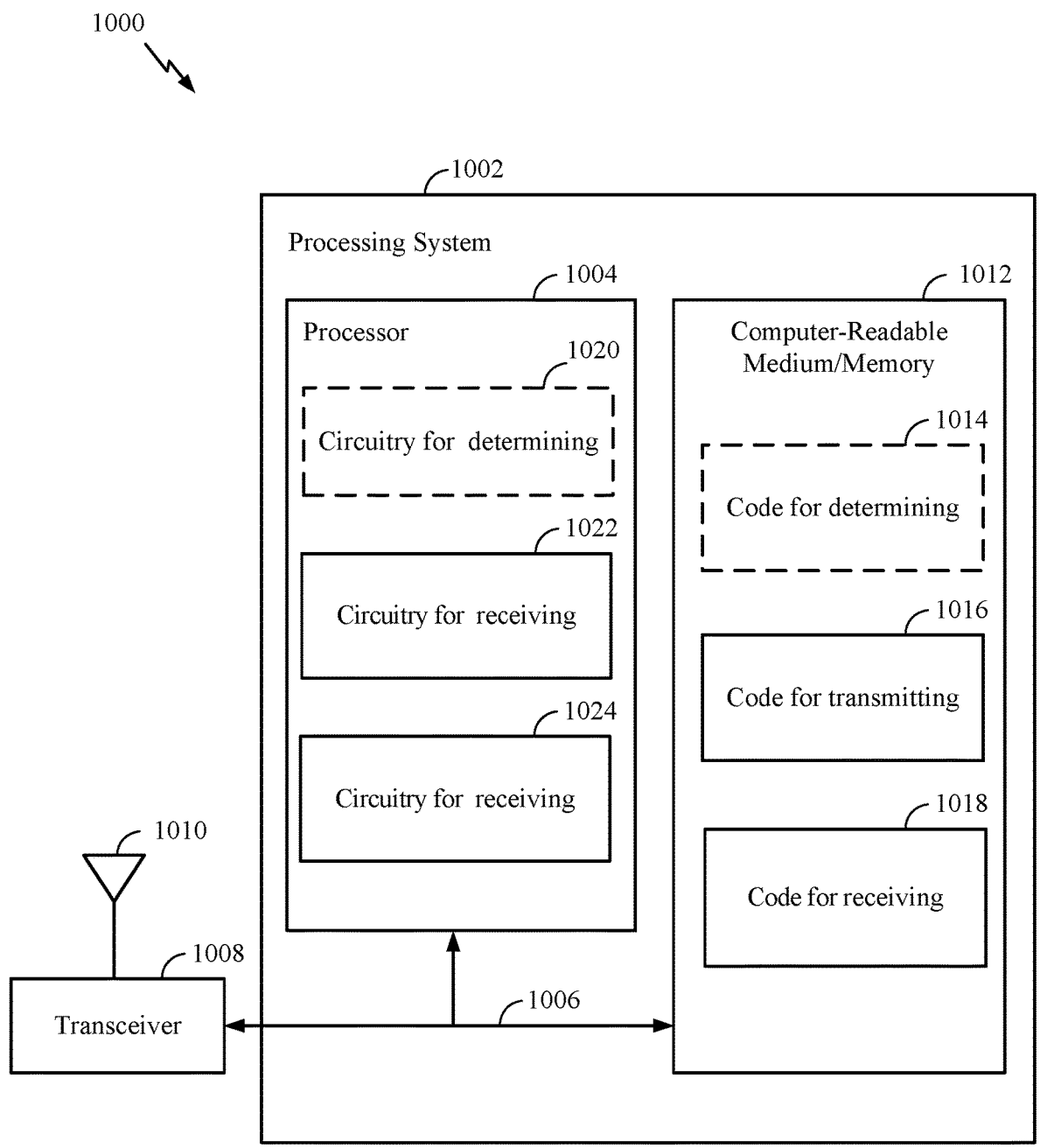
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 4 and/or FIG. 5. Communications device 1000 includes a processing system 1002 coupled to a transceiver 1008 (e.g., a transmitter and/or a receiver). Transceiver 1008 is configured to transmit and receive signals for communications device 1000 via an antenna 1010, such as the various signals as described herein. The processing system 1002 may be configured to perform processing functions for communications device 1000, including processing signals received and/or to be transmitted by communications device 1000.

Processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 4 and/or FIG. 5, or other operations for performing the various techniques discussed herein for slot aggregation configuration with UE assistance information. In certain aspects, computer-readable medium/memory 1012 stores code 1014 for determining; code 1016 for transmitting; and/or code 1018 for receiving, in accordance with aspects of the disclosure. In certain aspects, processor 1004 has circuitry configured to implement the code stored in computer-readable medium/memory 1012. Processor 1004 includes circuitry 1020 for determining; circuitry 1022 for transmitting; and/or circuitry 1024 for receiving, in accordance with aspects of the disclosure.

Figure 11:
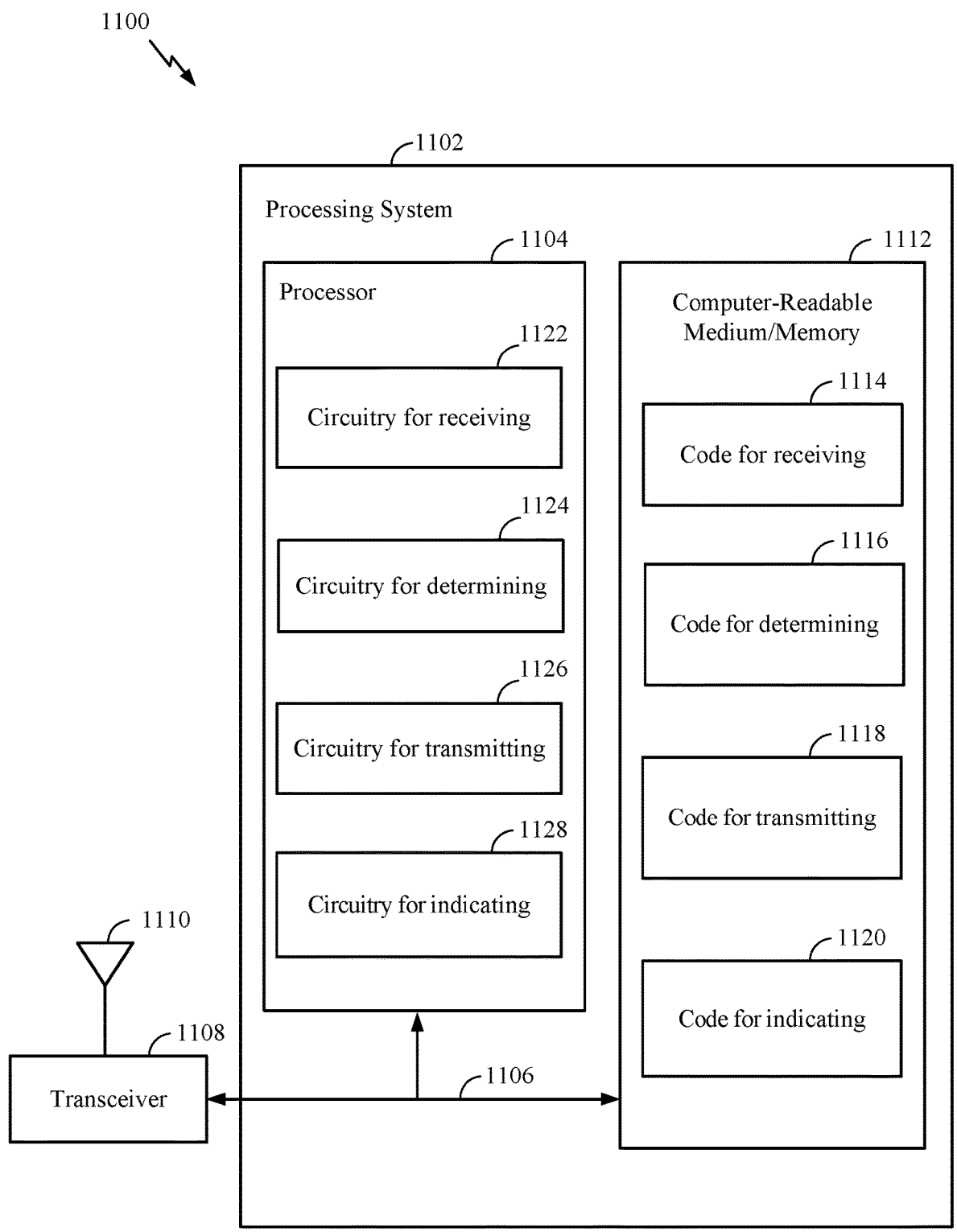
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8 and/or FIG. 9. Communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 11, or other operations for performing the various techniques discussed herein for slot aggregation configuration with UE assistance information. In certain aspects, computer-readable medium/memory 1112 stores code 1114 for receiving; code 1116 for determining; code 1118 for transmitting; and/or code 1120 for, in accordance with aspects of the disclosure. In certain aspects, processor 1104 has circuitry configured to implement the code stored in computer-readable medium/memory 1112. Processor 904 includes circuitry 1122 for receiving; circuitry 1124 for determining; circuitry 1126 for transmitting; and/or circuitry 1128 for indicating, in accordance with aspects of the disclosure.

The proposed slot aggregation configuration switching based on UE assistance information may improve reliability and reduce latency, and may reduce spectrum efficacy loss.

Example Aspects

In addition to the various aspects described above, the aspects can be combined. Some specific combinations of aspects are detailed below:

Aspect 1. A method for wireless communications by a user equipment (UE), comprising: transmitting, to a base station (BS), assistance information indicating a preferred repetition factor; and receiving a dynamic indication from the BS of a repetition factor.

Aspect 2. The method of aspect 1, wherein the repetition factor indicates a number of consecutive slots for repetitions of a transport block (TB).

Aspect 3. The method of any one or more of aspects 1-2, wherein the preferred repetition factor comprises an indication of a preferred uplink repetition factor, a preferred downlink repetition factor, or both.

Aspect 4. The method of any one or more of aspects 1-3, wherein the assistance information comprises a preferred slot aggregation configuration including the repetition factor, and wherein the repetition factor indicates a number of time domain repetitions.

Aspect 5. The method of aspect 4, wherein the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof.

Aspect 6. The method of any one or more of aspects 4-5, wherein the preferred slot aggregation configuration further comprises an indication of a preferred starting symbol position, a preferred symbol length, a preferred invalid symbol pattern indicating invalid symbols for segmentation repetition, or a combination thereof.

Aspect 7. The method of aspect 6, wherein the preferred starting symbol position, the preferred symbol length, or both, is indicated per time domain repetition.

Aspect 8. The method of any one or more of aspects 4-6, wherein the preferred slot aggregation configuration further comprises an indication of a preferred redundancy version (RV) pattern for the time domain repetitions.

Aspect 9. The method of any one or more of aspects 4-7, wherein the preferred slot aggregation configuration further comprises an indication of whether slot aggregation or sub-slot aggregation is preferred.

Aspect 10. The method of any one or more of aspects 4-8, wherein the preferred slot aggregation configuration further comprises an indication of whether frequency hopping is preferred for the time domain repetitions.

Aspect 11. The method of aspect 10, wherein the preferred slot aggregation configuration comprises an indication of a preferred frequency hopping offset, whether frequency hopping within a slot is preferred, whether frequency hopping in crossing slots is preferred, or a combination thereof.

Aspect 12. The method of any one or more of aspects 4-11, wherein the preferred slot aggregation configuration further comprises an indication of whether the UE prefers to send an early hybrid automatic repeat request (HARQ)

acknowledgement when the UE successfully decodes a transport block (TB) before all repetitions of the TB have been sent.

Aspect 13. The method of any one or more of aspects 1-12, further comprising determining the assistance information based on a mobility of the UE, radio frequency (RF) variation detected by the UE, a configuration of the UE, one or more target quality of service (QoS) parameters for one or more services, or a combination thereof.

Aspect 14. The method of any one or more of aspects 1-13, wherein transmitting the assistance information comprises transmitting the assistance information via radio resource control (RRC) signaling, a medium-access control (MAC) control element (CE), a channel status information (CSI) report, a channel state information (CSI) report, or a combination thereof.

Aspect 15. The method of any one or more of aspects 1-14, wherein transmitting the assistance information comprises transmitting the assistance information during at least one of call setup, call resume, call handover, or an on-going call.

Aspect 16. The method of any one or more of aspects 1-15, wherein the indication from the BS is received via radio resource control (RRC) signaling, a medium-access control (MAC) control element (CE), a downlink control information (DCI), or a combination thereof.

Aspect 17. A method for wireless communications by a base station (BS), comprising: receiving assistance information, from a user equipment (UE), indicating a preferred repetition factor; determining a repetition factor for the UE; and transmitting a dynamic indication of the determined repetition factor to the UE.

Aspect 18. The method of aspect 17, wherein the repetition factor indicates a number of consecutive slots for repetitions of a transport block (TB).

Aspect 19. The method of any one or more of aspects 17-18, wherein the preferred repetition factor comprises an indication of a preferred uplink repetition factor, a preferred downlink repetition factor, or both.

Aspect 20. The method of any one or more of aspects 17-19, wherein the assistance information comprises a preferred slot aggregation configuration including the repetition factor, and wherein the repetition factor indicates a number of time domain repetitions.

Aspect 21. The method of aspect 20, further comprising: determining a slot aggregation configuration for the UE based, at least in part, on the preferred slot aggregation configuration including accepting or rejecting the preferred repetition factor.

Aspect 22. The method of any one or more of aspects 20-21, wherein the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof.

Aspect 23. The method of any one or more of aspects 20-22, wherein the preferred slot aggregation configuration further comprises an indication of a preferred starting symbol position, a preferred symbol length, a preferred invalid symbol pattern indicating invalid symbols for segmentation repetition, or a combination thereof.

Aspect 24. The method of aspect 23, wherein the preferred starting symbol position, the preferred symbol length, or both, is indicated per time domain repetition.

Aspect 25. The method of any one or more of aspects 20-24, wherein the preferred slot aggregation configuration further comprises an indication of a preferred redundancy version (RV) pattern for the time domain repetitions.

Aspect 26. The method of any one or more of aspects 20-25, wherein the preferred slot aggregation configuration further comprises an indication of whether slot aggregation or sub-slot aggregation is preferred.

Aspect 27. The method of any one or more of aspects 20-26, wherein the preferred slot aggregation configuration further comprises an indication of whether frequency hopping is preferred for the time domain repetitions.

Aspect 28. The method of any one or more of aspects 17-27, wherein transmitting the dynamic indication to the UE comprising transmitting the dynamic indication via a medium access control (MAC) control element (CE) or downlink control information (DCI).

Aspect 29. An apparatus comprising means for performing the method of any of aspects 1 through 28.

Aspect 30. An apparatus comprising at least one processor and a memory coupled to the at least one processor, the memory comprising code executable by the at least one processor to cause the apparatus to perform the method of any of aspects 1 through 28.

Aspect 31. A computer readable medium storing computer executable code thereon for wireless communications that, when executed by at least one processor, cause an apparatus to perform the method of any of aspects 1 through 28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full meaning consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the meaning of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communications, comprising:
   a transceiver;
   at least one processor; and
   a memory coupled to the at least one processor, the memory comprising code executable by the at least one processor to cause the apparatus to:

transmit, via the transceiver to a network node, assistance information indicating a preferred repetition factor, wherein the assistance information comprises a preferred slot aggregation configuration that comprises the preferred repetition factor and the preferred repetition factor indicates a number of time domain repetitions; and receive, via the transceiver from the network node, a dynamic indication of a repetition factor, wherein at least one of:

the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof;

the preferred slot aggregation configuration further comprises an indication of a preferred starting symbol position, a preferred symbol length, a preferred invalid symbol pattern indicating invalid symbols for segmentation repetition, or a combination thereof;

the preferred slot aggregation configuration further comprises an indication of whether frequency hopping is preferred for the time domain repetitions; or the preferred slot aggregation configuration further comprises an indication of whether the apparatus prefers to send an early hybrid automatic repeat request (HARQ) acknowledgement when the apparatus successfully decodes a transport block (TB) before all repetitions of the TB have been sent.

2. The apparatus of claim 1, wherein the repetition factor indicates a number of consecutive slots for repetitions of a transport block (TB).

3. The apparatus of claim 1, wherein the preferred repetition factor comprises an indication of a preferred uplink repetition factor, a preferred downlink repetition factor, or both.

4. The apparatus of claim 1, wherein the preferred starting symbol position, the preferred symbol length, or both are indicated per time domain repetition.

5. The apparatus of claim 1, wherein the preferred slot aggregation configuration further comprises an indication of a preferred redundancy version (RV) pattern for the time domain repetitions.

6. The apparatus of claim 1, wherein the preferred slot aggregation configuration comprises an indication of a preferred frequency hopping offset, whether frequency hopping within a slot is preferred, whether frequency hopping in crossing slots is preferred, or a combination thereof.

7. The apparatus of claim 1, wherein the at least one processor is configured to further cause the apparatus to determine the assistance information based on a mobility of the apparatus, radio frequency (RF) variation detected by the apparatus, a configuration of the apparatus, one or more target quality of service (QoS) parameters for one or more services, or a combination thereof.

8. The apparatus of claim 1, wherein transmitting the assistance information comprises transmitting the assistance information via radio resource control (RRC) signaling, a medium-access control (MAC) control element (CE), or a combination thereof.

9. The apparatus of claim 1, wherein the transmission of the assistance information comprises transmitting the assistance information during at least one of call setup, call resume, call handover, or an on-going call.

10. The apparatus of claim 1, wherein the indication from the network node is received via radio resource control (RRC) signaling, a medium-access control (MAC) control element (CE), a downlink control information (DCI), or a combination thereof.

11. An apparatus for wireless communications, comprising:

a transceiver;

at least one processor; and a memory coupled to the at least one processor, the memory comprising code executable by the at least one processor to cause the apparatus to:

receive assistance information, via the transceiver from a user equipment (UE), indicating a preferred repetition factor, wherein the assistance information comprises a preferred slot aggregation configuration including the preferred repetition factor, and the preferred repetition factor indicates a number of time domain repetitions;

determine a repetition factor; and transmit, via the transceiver to the UE, a dynamic indication of the determined repetition factor, wherein at least one of:

the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof;

the preferred slot aggregation configuration further comprises an indication of a preferred starting symbol position, a preferred symbol length, a preferred invalid symbol pattern indicating invalid symbols for segmentation repetition, or a combination thereof;

the preferred slot aggregation configuration further comprises an indication of whether frequency hopping is preferred for the time domain repetitions; or the preferred slot aggregation configuration further comprises an indication of whether the UE prefers to send an early hybrid automatic repeat request (HARQ) acknowledgement when the UE successfully decodes a transport block (TB) before all repetitions of the TB have been sent.

12. The apparatus of claim 11, wherein the repetition factor indicates a number of consecutive slots for repetitions of a transport block (TB).

13. The apparatus of claim 11, wherein the preferred repetition factor comprises an indication of a preferred uplink repetition factor, a preferred downlink repetition factor, or both.

14. The apparatus of claim 11, wherein the at least one processor is configured to further cause the apparatus to:

determine a slot aggregation configuration for the UE based, at least in part, on the preferred slot aggregation configuration including accepting or rejecting the preferred repetition factor.

15. The apparatus of claim 11, wherein the preferred starting symbol position, the preferred symbol length, or both, is indicated per time domain repetition.

16. The apparatus of claim 11, wherein the preferred slot aggregation configuration further comprises an indication of a preferred redundancy version (RV) pattern for the time domain repetitions.

17. The apparatus of claim 11, wherein the transmission of the dynamic indication comprising transmitting the dynamic indication via a medium access control (MAC) control element (CE) or downlink control information (DCI).

18. A method for wireless communications by a user equipment (UE), comprising:
  transmitting, to a network node, assistance information indicating a preferred repetition factor, wherein the assistance information comprises a preferred slot aggregation configuration including the preferred repetition factor, and the preferred repetition factor indicates a number of time domain repetitions; and
  receiving, from the network node, a dynamic indication of a repetition factor, wherein at least one of:
    the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof;
    the preferred slot aggregation configuration further comprises an indication of a preferred starting symbol position, a preferred symbol length, a preferred invalid symbol pattern indicating invalid symbols for segmentation repetition, or a combination thereof;
    the preferred slot aggregation configuration further comprises an indication of whether frequency hopping is preferred for the time domain repetitions; or
    the preferred slot aggregation configuration further comprises an indication of whether the UE prefers to send an early hybrid automatic repeat request (HARQ) acknowledgement when the UE successfully decodes a transport block (TB) before all repetitions of the TB have been sent.

19. A method for wireless communications by a network node, comprising:
  receiving assistance information, from a user equipment (UE), indicating a preferred repetition factor, wherein the assistance information comprises a preferred slot aggregation configuration including the preferred repetition factor, and the preferred repetition factor indicates a number of time domain repetitions;
  determining a repetition factor for the UE; and
  transmitting, to the UE, a dynamic indication of the determined repetition factor, wherein at least one of:
    the preferred slot aggregation configuration further comprises an indication of whether slot aggregation crossing slot boundary is preferred or not preferred, a preferred slot aggregation crossing downlink switch point, a preferred slot aggregation crossing uplink switch point, or a combination thereof;
    the preferred slot aggregation configuration further comprises an indication of a preferred starting symbol position, a preferred symbol length, a preferred invalid symbol pattern indicating invalid symbols for segmentation repetition, or a combination thereof;
    the preferred slot aggregation configuration further comprises an indication of whether frequency hopping is preferred for the time domain repetitions; or
    the preferred slot aggregation configuration further comprises an indication of whether the UE prefers to send an early hybrid automatic repeat request (HARQ) acknowledgement when the UE successfully decodes a transport block (TB) before all repetitions of the TB have been sent.

20. The method of claim 18, wherein the repetition factor indicates a number of consecutive slots for repetitions of a transport block (TB).

21. The method of claim 18, wherein the preferred repetition factor comprises an indication of a preferred uplink repetition factor, a preferred downlink repetition factor, or both.

22. The method of claim 18, wherein the preferred starting symbol position, the preferred symbol length, or both are indicated per time domain repetition.

23. The method of claim 18, wherein the preferred slot aggregation configuration further comprises an indication of a preferred redundancy version (RV) pattern for the time domain repetitions.

24. The method of claim 18, wherein the preferred slot aggregation configuration comprises an indication of a preferred frequency hopping offset, whether frequency hopping within a slot is preferred, whether frequency hopping in crossing slots is preferred, or a combination thereof.

25. The method of claim 18, further comprising determining the assistance information based on a mobility of the UE, radio frequency (RF) variation detected by the UE, a configuration of the UE, one or more target quality of service (QoS) parameters for one or more services, or a combination thereof.

26. The method of claim 18, wherein transmitting the assistance information comprises transmitting the assistance information via radio resource control (RRC) signaling, a medium-access control (MAC) control element (CE), or a combination thereof.

27. The method of claim 18, wherein transmitting the assistance information comprises transmitting the assistance information during at least one of call setup, call resume, call handover, or an on-going call.

28. The method of claim 18, wherein the indication from the network node is received via radio resource control (RRC) signaling, a medium-access control (MAC) control element (CE), a downlink control information (DCI), or a combination thereof.

29. The method of claim 19, wherein the repetition factor indicates a number of consecutive slots for repetitions of a transport block (TB).

30. The method of claim 19, wherein the preferred repetition factor comprises an indication of a preferred uplink repetition factor, a preferred downlink repetition factor, or both.

* * * * *